June 23, 1936.  J. H. DILLON ET AL  2,045,548
PLASTOMETER
Filed Dec. 14, 1933   5 Sheets-Sheet 2

INVENTORS
JOHN H. DILLON
AND
RAYMOND W. ALLEN
By
ATTORNEYS

June 23, 1936.    J. H. DILLON ET AL    2,045,548
PLASTOMETER
Filed Dec. 14, 1933    5 Sheets-Sheet 5

INVENTORS
JOHN H. DILLON
AND
RAYMOND W. ALLEN
BY Ely & Barrow
ATTORNEYS

Patented June 23, 1936

2,045,548

UNITED STATES PATENT OFFICE 2,045,548

PLASTOMETER

John H. Dillon and Raymond W. Allen, Akron, Ohio, assignors to The Firestone Tire & Rubber Company, Akron, Ohio, a corporation of Ohio Application December 14, 1933, Serial No. 702,337

7 Claims. (Cl. 265—11)

This invention relates to plastometers, and more especially it relates to plastometers of the extrusion type.

The invention is of primary utility in the development of rubber extruding machines for production use, it being found that existing plastometers, both of the extrusion type and the compression type, fail to correlate with factory extrusion machines, due in great measure to the fact that they employ much lower rates of shear than obtains in the usual existing extrusion machines.

The chief object of the invention is to provide an improved plastometer of the extrusion type wherein flow conditions coincide with those in production extrusion machines. More specifically the invention aims to provide means for obtaining constant and uniform temperature of the rubber stocks being tested; to provide for effecting extrusion of plastic rubber through an orifice of determinate size under conditions making for uniformity of successive tests; and to provide means for accurately determining the time required to effect extrusion of the test piece. Other objects will be manifest.

Briefly stated, the plastometer embodying this invention determines the rate of extrusion for a given pressure and temperature, through an orifice of determinate size. From these results it is possible to obtain the rate of shear, which may be considered a criterion of flow conditions suitable for comparative purposes. The results obtained by applicant's plastometer also may be used for determining the two quantities necessary to define the plastic state of a material, namely, the mobility and the yield stress. The method of measuring plasticity of rubber is not a part of this invention, and therefore need not be described in greater detail.

Of the accompanying drawings;

Figure 7 is a wiring diagram of timing mechanism associated with the plastometer.

Figure 1:
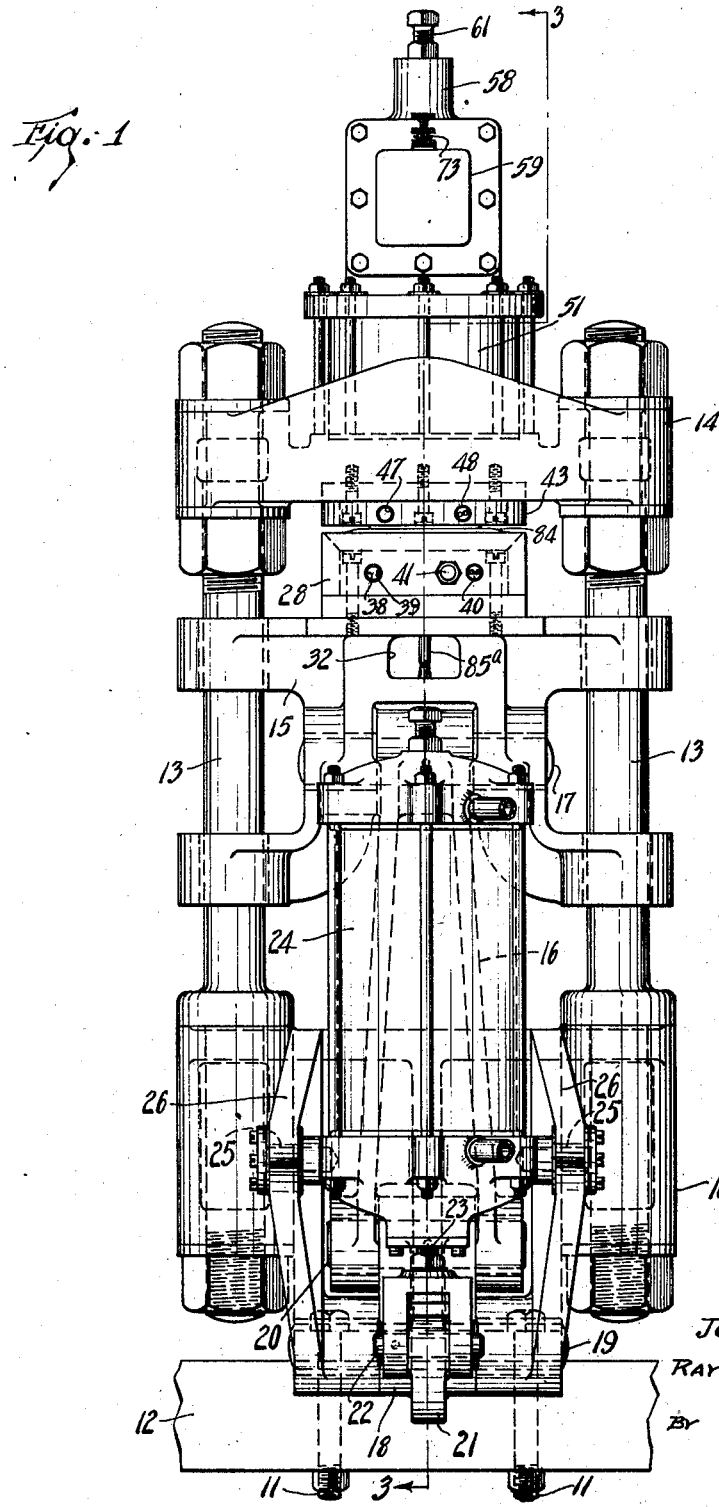
Figure 1 is a rear elevation of a plastometer embodying the invention in its preferred form, in its closed or operating position.

Referring to the drawings, the plastometer shown comprises a base casting 10 which is secured by bolts 11, 11 to any suitable support 12, the latter being mobile if desired. Rising from the base casting 10 is a pair of parallel, vertical supports or guide posts 13, 13 which carry, at their upper ends, a stationary head or platen 14. Mounted for vertical, reciprocating movement upon the guide posts 13 is a slide or platen 15. The latter is reciprocated by fluid pressure operated means acting through a toggle comprising a member 16 that is pivotally connected to the slide 15 at 17, and a member 18 that is pivotally mounted at 19 upon the base casting 10 and pivotally connected to member 16 at 20. The toggle member 18 is formed with a projecting lever arm 21, the free end of which is pivotally connected at 22 to the outer end of a piston rod 23 of a double-acting fluid pressure cylinder 24, the latter being pivotally mounted at 25 in a pair of bracket arms 26, 26 formed on the base casting 10. The arrangement is such that the movable platen 15 is lowered when the upper end of the cylinder 24 is charged, and raised when the lower end of the cylinder is charged.

Mounted upon the top of the platen 15 is a box-like heat-insulating jacket 28 of bakelite or the like, and mounted in said jacket is a lower die block 29. The said die block 29 is formed with a central aperture 30 that is aligned with a central aperture 31 in the jacket 28 and a somewhat larger aperture 32 in the top of the platen 15. Threaded into aperture 30 of the die block 29 is a die 33 formed with an extrusion orifice 34 that is ⅛" in diameter and ₁⁄₁₆" in length. The dimensions given are arbitrary and may be changed if desired. The upper end of the orifice 34 is conically flared, tapered or countersunk at an angle of 45°, said countersink being ¾" diameter at its large end. The upper face of the die block 29 is formed with an annular groove 36 that is concentric with the axis of die orifice 34, the inner edge of said groove being formed with a 30° bevel or chamfer as shown.

Figure 6:
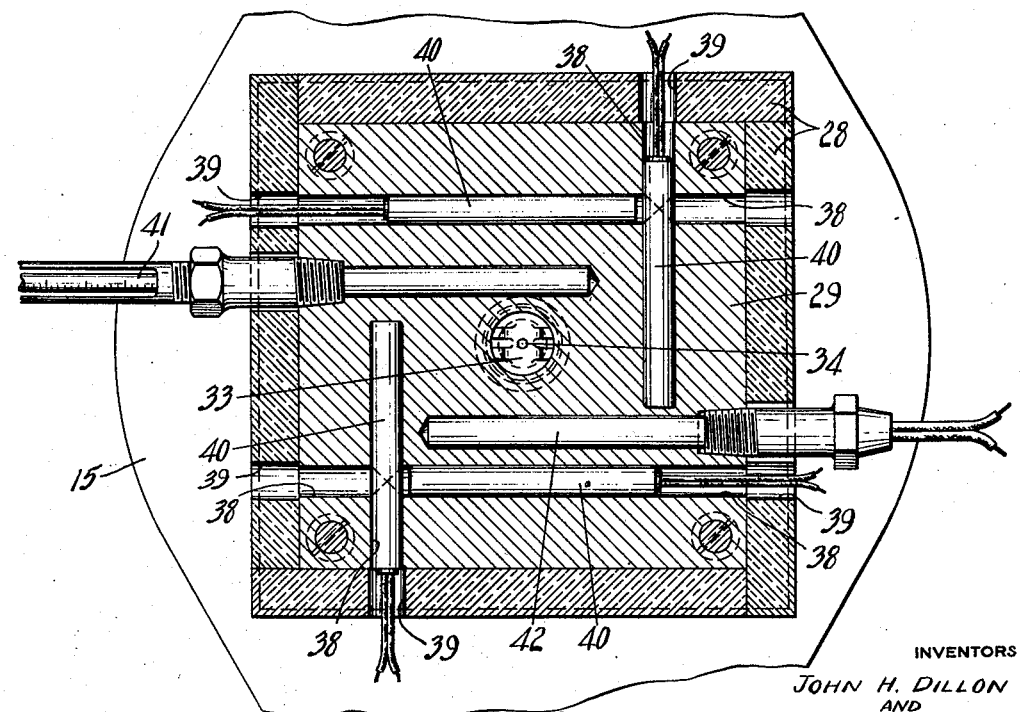
Figure 6 is a section on the line 6—6 of Figure 4.

As is most clearly shown in Figure 6, the die block 29 is formed with a plurality of symmetrically arranged intersecting transverse bores 38, 38 and the jacket 28 is formed with corresponding apertures 39. Mounted in the bores 38 are respective electrical heating elements 40 by which the die block is heated. Two other bores, similar to the bores 38 but disposed somewhat nearer the die 33, are formed in the die block 29 for receiving a thermometer 41, and the element 42 of a thermostatic control (not shown) by means of which the die block 29 is kept at constant uniform temperature.

Mounted upon the bottom face of the stationary head or platen 14 is an annular box-like jacket 43 of insulating material, and mounted in said jacket is an upper die 44 that is formed with a downwardly extending, annular flange 45 defining a cup-shaped concavity 46. The flange 45 is concentric with the axis of the lower die 33, the arrangement being such that when the lower platen 15 is in elevated, operative position, the inner surface of the flange 45, at lower edge thereof, will engage the beveled surface at the inner edge of groove 36 with a sealing fit. The upper die 44 is formed with a plurality of bores 47 that are arranged similarly to the bores 38 in the lower die block, electrical heating elements 48 being mounted in the respective bores 47. Also a thermometer 49 is mounted in the upper die 44, relatively close to the axis thereof.

Figure 2:
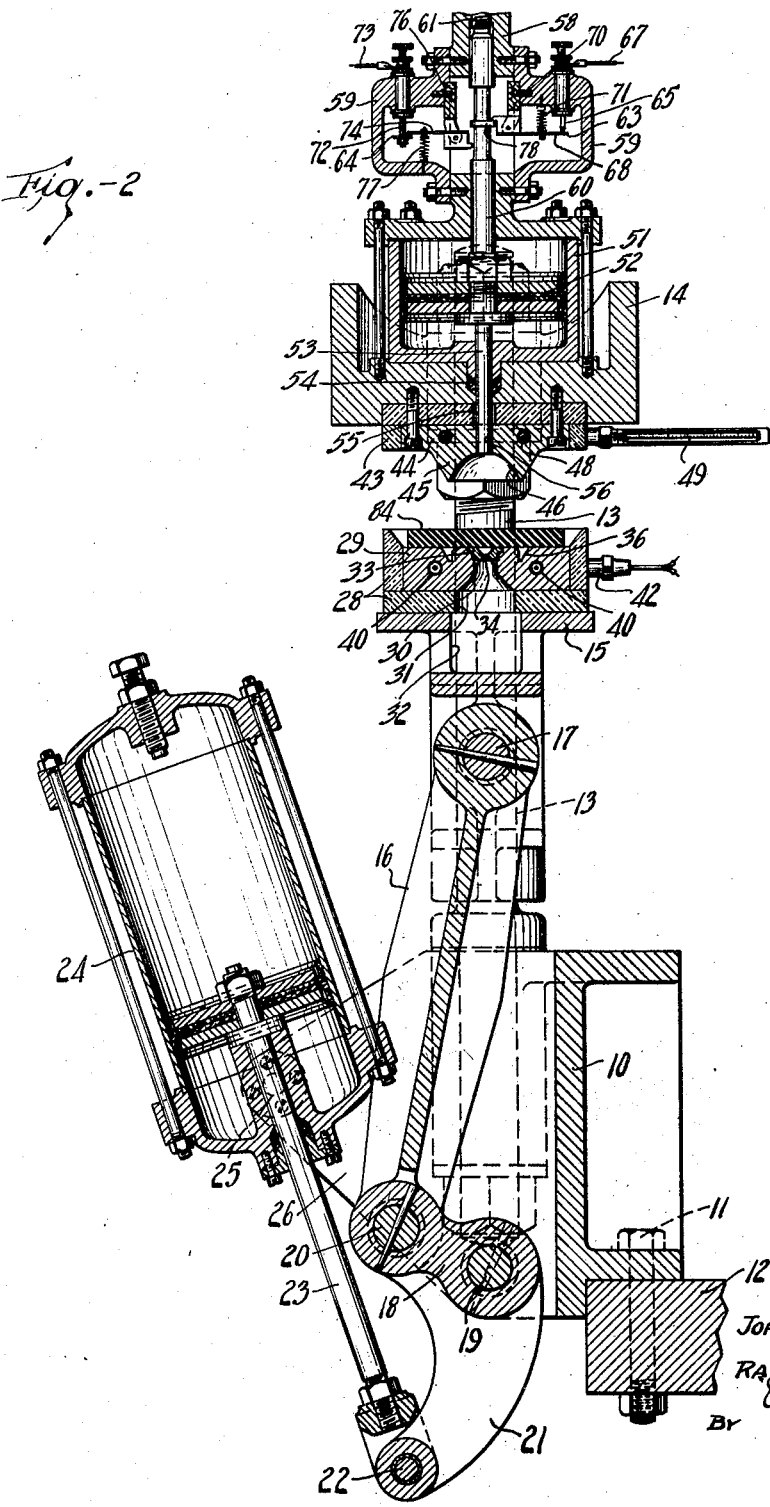
Figure 2 is vertical central section through the device in the open or inoperative position thereof.
Figure 3:
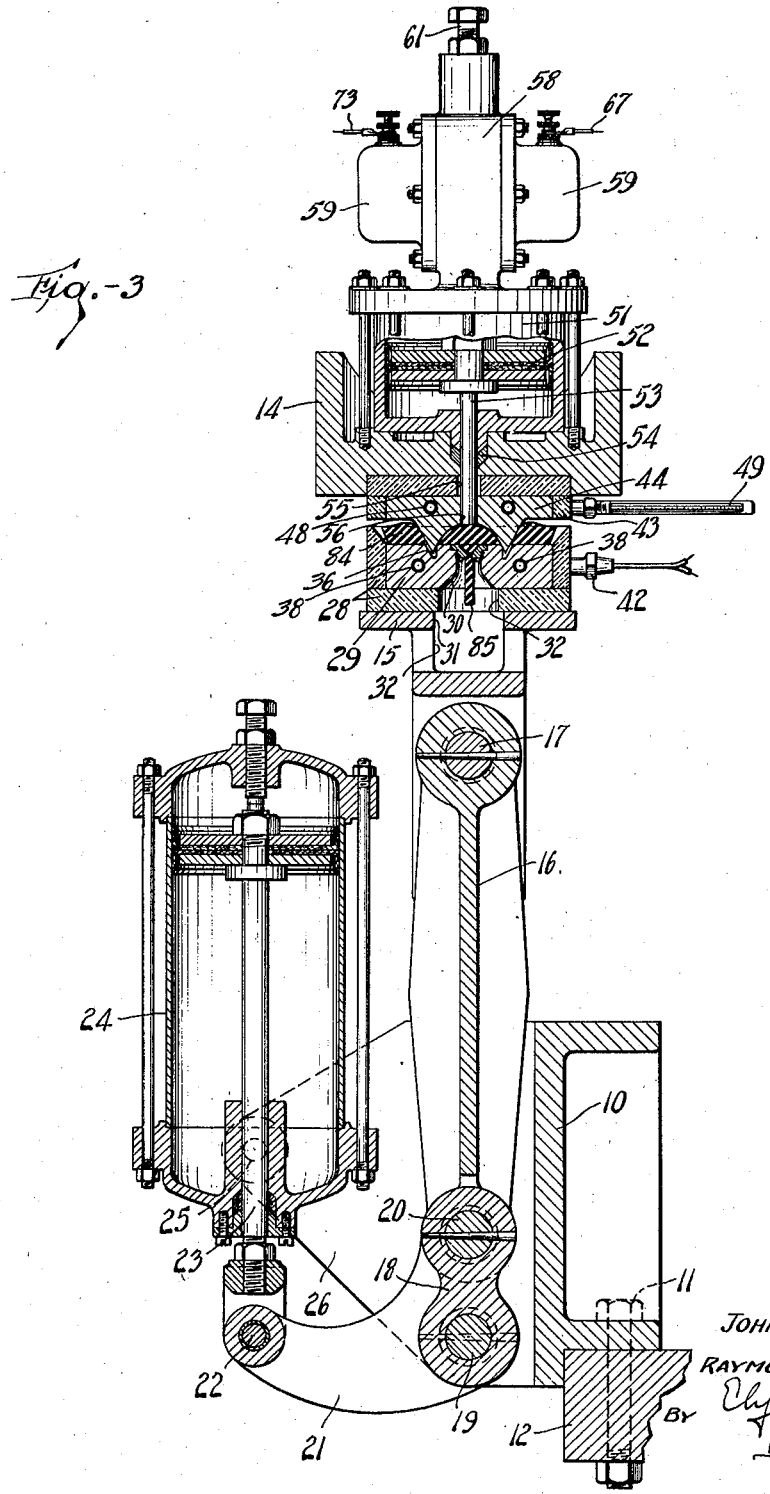
Figure 3 is a section on the line 3—3 of Figure 1, showing the position of elements of the device in the initial phase of operation.

Mounted upon the top of the stationary platen 14 is a double acting fluid pressure-operated cylinder 51 having the usual piston 52, and a piston rod 53 that extends downwardly through a relatively large aperture 55 in the jacket 43, and has its lower end portion slidably fitted in an axial aperture 56 extending through the upper die 44 and opening into the cavity 46 therein. The arrangement is such that when the lower end of cylinder 51 is charged, the lower end of piston rod 53 is flush with the bottom of cavity 46 as shown in Figures 2 and 3.

Figure 4:
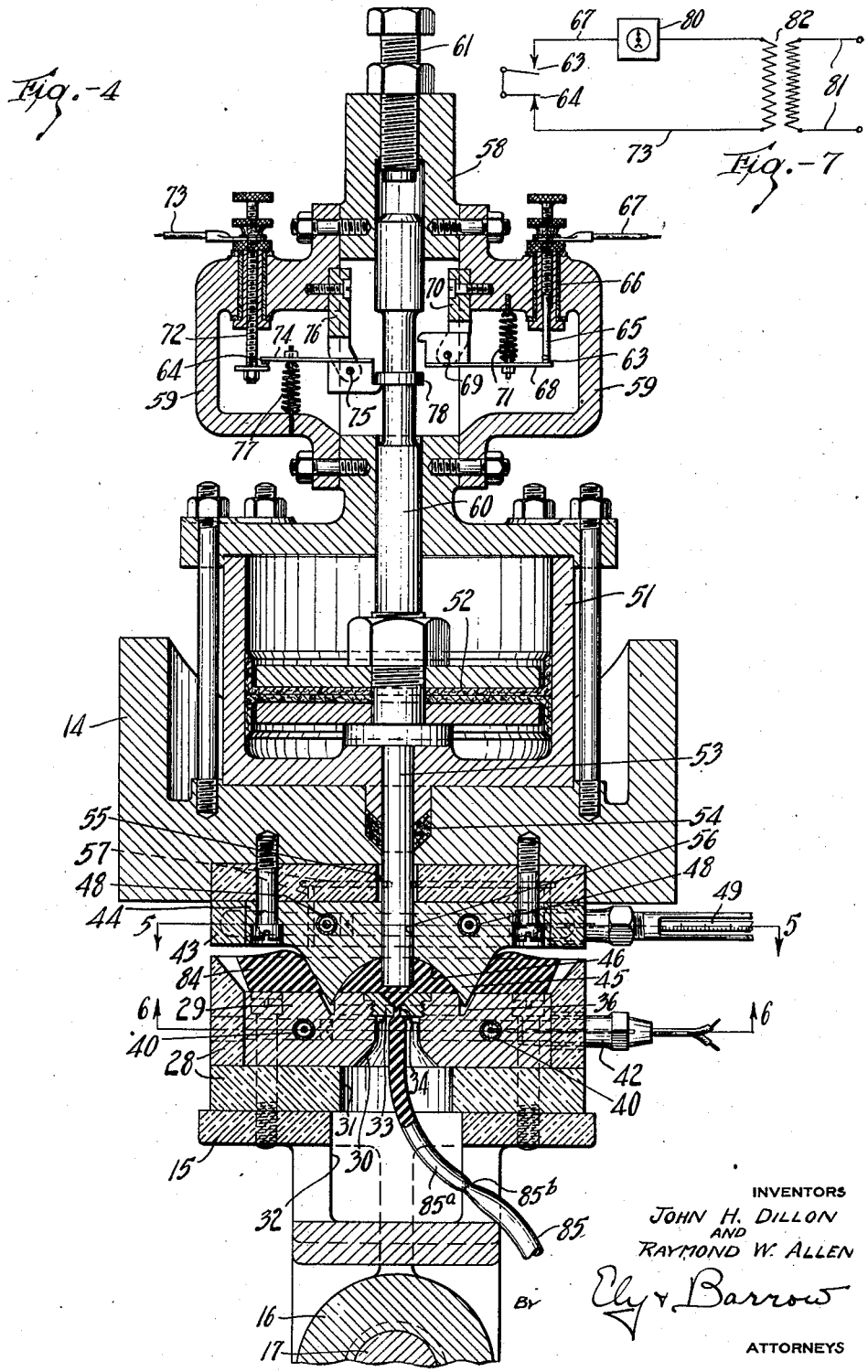
Figure 4 is a fragmentary section, on a larger scale, of some of the parts shown in Figure 3 in the final phase of operation.
Figure 5:
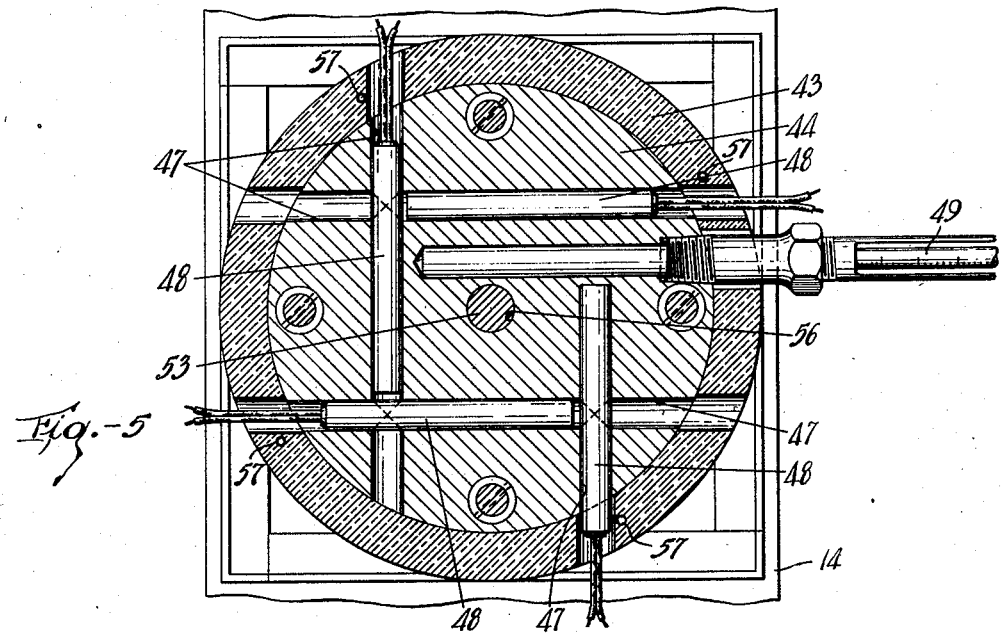
Figure 5 is a section on the line 5—5 of Figure 4.

When the upper end of cylinder 51 is charged, the lower end of the piston rod extends into cavity 46, and with the lower platen 15 in raised position, nearly to the die 33 as shown in Figure 4. The ratio of the diameters of cylinder 51 and piston rod 53 is such that the shear stress is of such magnitude as to give a rate of shear at the orifice comparable to the rate of shear encountered in factory operations. Suitable ducts 57 are formed in the jacket 43 to vent the aperture 55 therein to the atmosphere. The upper cylinder head of the cylinder 51 is formed with an upwardly extending portion 58 that is open in its middle, and suitable covers 59, 59 are mounted upon opposite sides of said portion 58 to close the opening therein. The piston 53 is provided with a tail rod 60 that extends upwardly through the cylinder head portion 58, and a bolt 61 is threaded into the top of the latter in position to engage the upper end of the tail rod 60 and thus to provide an adjustable stop for the piston 52 in its upper position.

Each of the covers 59 constitutes a switch box for respective switches 63, 64 that are operated by the tail rod 60. The switch 63 comprises a contact member 65 that extends through the top of cover 59 into the interior thereof, said contact member being insulated from said cover by a sleeve of insulating material 66, and at its outer end being provided with means for connecting it to an electrical conductor 67. A breaker arm 68 is pivotally mounted at 69 on a bracket 70 that is mounted interiorly of the cover 59, and a tension spring 71 is so arranged as normally to hold the outer end of breaker arm 68 in contact with the inner end of contact member 65. The switch 64 comprises a contact member 72 that is supported in and insulated from the other cover 59 and connected at its outer end to an electrical conductor 73. A breaker arm 74 is pivotally mounted at 75 on a bracket 76 at a somewhat lower point than breaker arm 68, and a tension spring 77 normally urges its outer end into contact with contact member 72.

Between the breaker arms 68, 74 the tail rod 60 is formed with a flange 78 adapted alternately to engage the inner ends of said breaker arms and tilt them against the tension of their respective springs 71, 77, to open the switches 63, 64 at the conclusion of the respective upward and downward movements of the piston 52.

As is most clearly shown in Figure 7, the switches 63, 64 are in series with each other and with an electrical clock 80, the latter being mounted at some convenient place adjacent the plastometer. Operating power is supplied from a 110 volt line 81 through a transformer 82. The arrangement is such that the clock runs during the down-stroke of piston 52, but does not run when either switch 63, 64 is open, that is, when the piston 52 is at either end of its stroke.

In the operation of the plastometer, test pieces of unvulcanized rubber composition 84 are prepared by preheating them for a suitable length of time, after which one of them is mounted on the die holder 29 as shown in Figure 2. The lower end of cylinder 24 is then charged whereby the toggle is operated to raise the lower platen 15, with the result that the die holder 29 is moved into engagement with the upper die 44 as is most clearly shown in Figure 3. Thus a local region of the test piece 84 is confined in the cavity 46 of the upper die 44, the excess of rubber being forced through the orifice 34 of the die 33 in the form of an elongate cylindrical cord 85. Air entrapped in the cavity 46 or occluded in the rubber escapes through orifice 34 and along the piston rod 53, passing out through the ducts 57. The plastometer is allowed to remain in the position shown in Figure 3 for several minutes to allow the test piece confined in the cavity 46 to attain the proper temperature, it being understood that heating elements 40 and 48 are constantly in operation.

Fluid pressure is then admitted to the upper end of cylinder 51 to move the piston rod 53 thereof downwardly to effect extrusion of the confined test piece through the die 33. As soon as the piston rod starts its downward movement, the downward movement of the tail rod 60 permits the switch 63 to close whereupon the clock starts running. When the piston reaches the lower end of cylinder 51, the tail rod opens switch 64 and the clock stops running, the elapsed time being the duration of the extrusion. The rubber extruded by the piston rod 53 is designated 85a, and is distinguishable from the previously extruded piece 85 by a line of demarcation 85b. The extruded rubber 85a may be severed and measured before cooling, the measurement of length giving an inverse measure of the amount of recovery. The residual elasticity in the stock causes the extruded rubber strip 85a to expand in diameter upon emergence from the orifice. Since the volume of rubber is constant the measurement of length gives an inverse measure of diameter and consequently of elastic recovery. The upper end of cylinder 24 is then charged to lower the platen 15 so that the rubber remaining in the cavity 46 may be removed. The lower end of the cylinder 51 is then charged to lift the piston rod 53 and the device is ready for another test as described.

The improved plastometer gives accurate results and achieves the other objects set out in the foregoing statement of objects.

Modification may be resorted to without departing from the spirit of the invention or the scope of the appended claims, which are not limited wholly to the specific construction shown and described.

What is claimed is:

1. In a plastometer, the combination of a pair of relatively movable die members defining a cavity of determinate volumetric capacity, one of said die members being formed with a flange to shear off a quantity of material from a test piece of plastic material of larger size and confine it in said cavity when said die members are brought together upon said test piece, said die members being constructed and arranged to so shear off said material as to entirely fill said cavity of determinate volumetric capacity, there being an extrusion orifice opening out of said cavity, a plunger having access to said cavity, and means for moving said plunger into said cavity to extrude material therefrom through said orifice.

2. In a plastometer, the combination of a pair of relatively movable die members, one of which is formed with a cavity defined by a sharp-edged flange and the other is formed with means cooperating with said flange to shear off a quantity of material from a test piece of plastic material of larger size when said die members are brought together thereupon, there being an extrusion orifice opening out of said cavity, a plunger having one end thereof normally flush with the surface of said cavity, and means for moving said plunger into said cavity to effect extrusion of material therefrom through said orifice.

3. In a plastometer, the combination of a stationary die formed with a cavity defined by a sharp-edged flange, a movable die formed with means cooperating with said flange to close said cavity and confine therein a piece of material sheared from a larger piece of plastic material when said dies are brought together upon said test piece, there being an extrusion orifice in one of said dies opening out of said cavity, a plunger having one end thereof normally flush with the surface of said cavity, and means for moving said plunger a determinate distance into said cavity to extrude material therefrom through said orifice.

4. In a plastometer, the combination of a plurality of relatively movable die members adapted to be brought together to define a cavity of determinate volumetric capacity for a test piece of plastic material, there being an extrusion orifice opening out of said cavity, said die members being constructed and arranged to so shear off a quantity of material from a test piece of material of larger size, as entirely to fill said cavity when said die members are brought together upon said test piece, a plunger having access to said cavity, and means for moving said plunger a determinate distance into said cavity to extrude material therefrom through said orifice.

5. In a plastometer, the combination of means defining a cavity for a test piece of plastic material, said cavity being formed with an extrusion orifice, a plunger having access to said cavity, fluid pressure means comprising a cylinder and piston to which said plunger is connected, said piston being movable a determinate distance in opposite directions, to reciprocate said plunger, an electrically operated clock, and means associated with said piston for causing said clock to run when the piston moves away from one end of the cylinder and causing said clock to stop when the piston reaches the opposite end of said cylinder.

6. In a plastometer, the combination of a pair of relatively movable die members defining a cavity of determinate volumetric capacity, said die members being constructed to entrap a quantity of material from a test body of plastic material of larger size and confine it in said cavity as to entirely fill same when said die members are brought together upon said test body, there being an extrusion orifice opening out of said cavity, and means for extruding a portion of said test body from said cavity through said orifice.

7. Apparatus for testing plasticity comprising two relatively movable test stock confining members having recessed portions to form a cavity therebetween, whereby a specimen of uniform volume may be separated from plastic stock interposed between said members upon said members being moved together, an extrusion orifice communicating with said cavity, and means applying extruding pressure upon the entrapped specimen.

JOHN H. DILLON.
RAYMOND W. ALLEN.